Oct. 7, 1969      R. C. KAMP      3,470,692

PARALLEL DUAL ACCUMULATOR SEAT SUSPENSION

Filed March 13, 1967                                 2 Sheets-Sheet 1

INVENTOR
RONALD C. KAMP

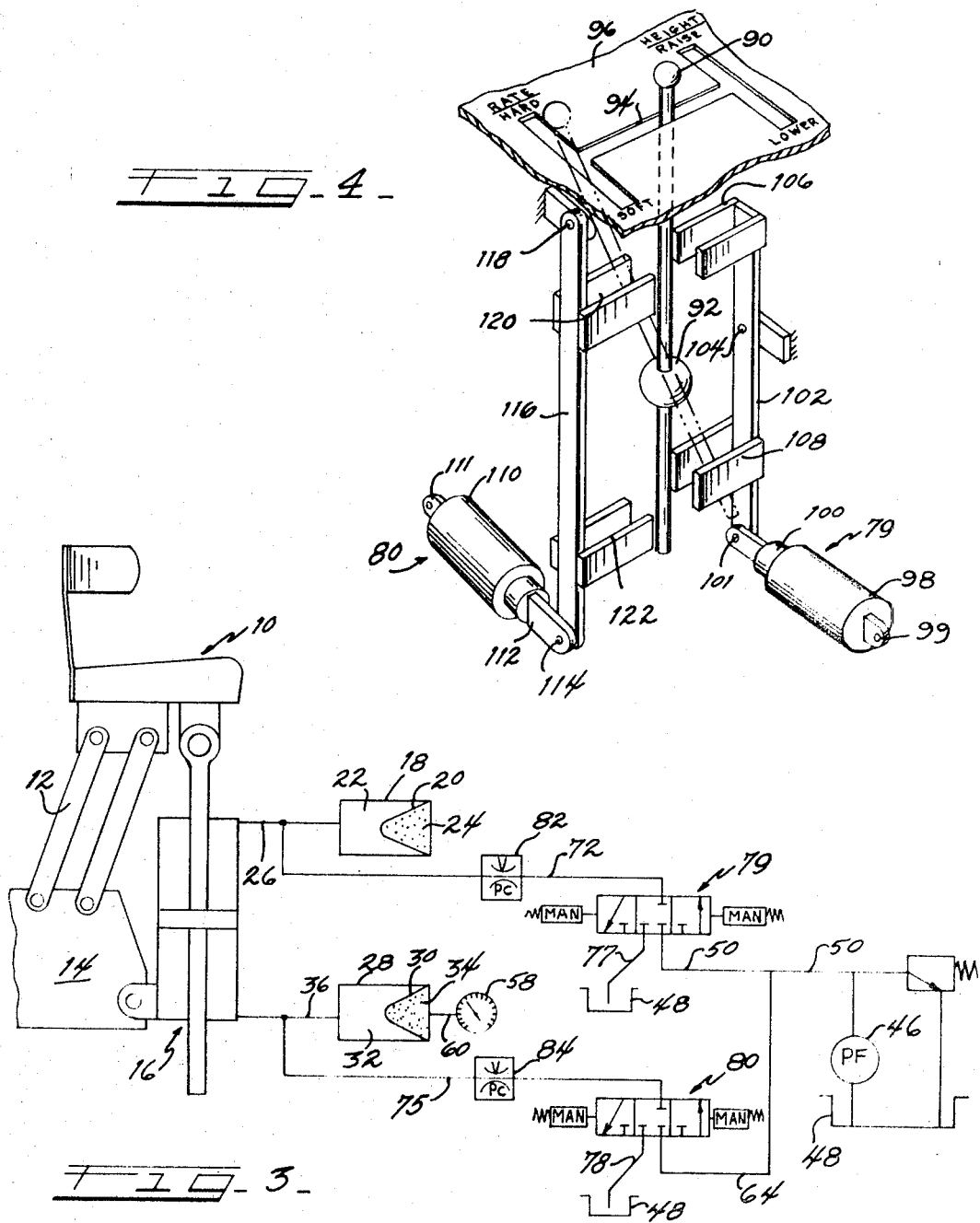

United States Patent Office 3,470,692
Patented Oct. 7, 1969

3,470,692
PARALLEL DUAL ACCUMULATOR
SEAT SUSPENSION
Ronald C. Kamp, Wilmette, Ill., assignor to International
Harvester Company, Chicago, Ill., a corporation of
Delaware
Filed Mar. 13, 1967, Ser. No. 622,507
Int. Cl. F15b 1/02, 13/04
U.S. Cl. 60—51                                   12 Claims

ABSTRACT OF THE DISCLOSURE

A suspension for a vehicle seat having a linkage connecting the seat to the vehicle and including a hydraulic ram, a pair of accumulators connected to either end of the ram and a valve means for selectively directing fluid pressure to or draining fluid pressure from either or both ends of the ram to independently control the height of the seat and the spring rate.

BACKGROUND AND SUMMARY OF THE INVENTION

The present invention relates to supports generally and more particularly to support stands having a surface supported resiliently by a fluid spring.

The use of a fluid spring, such as a hydraulic ram and accumulator, for example, in the suspension of a vehicle seat is an old expedient. However, the prior art in this field has generally utilized a single acting ram with the accumulator communicating with the working end thereof. Two problems are created by such an arrangement, namely, poor rebound control and an undesirable complete extension of the ram upon dismounting. In addition, the use of a single acting hydraulic ram and accumulator renders independent control of both height and the spring rate for the seat difficult to achieve.

It is, therefore, an object of the present invention to provide a seat suspension having positive rebound control, and limited upward movement of the seat upon dismounting.

It is also an object of the present invention to provide a seat suspension having means for positive and independent control of both the spring rate and the height or elevation of the seat.

It is another object of the present invention to provide a control means for selectively directing hydraulic fluid under pressure to or draining fluid pressure from either or both ends of a hydraulic ram incorporated into a seat suspension linkage.

BRIEF DESCRIPTION OF THE DRAWINGS

FIGURE 3 is also a schematic representation of a seat suspension incorporating a hydraulic circuit according to the present invention but illustrating still another embodiment thereof; and FIGURE 4 is an isometric view of a control linkage for actuation of the circuit shown in FIGURE 3.

DESCRIPTION OF THE PREFERRED EMBODIMENTS

Figure 1:
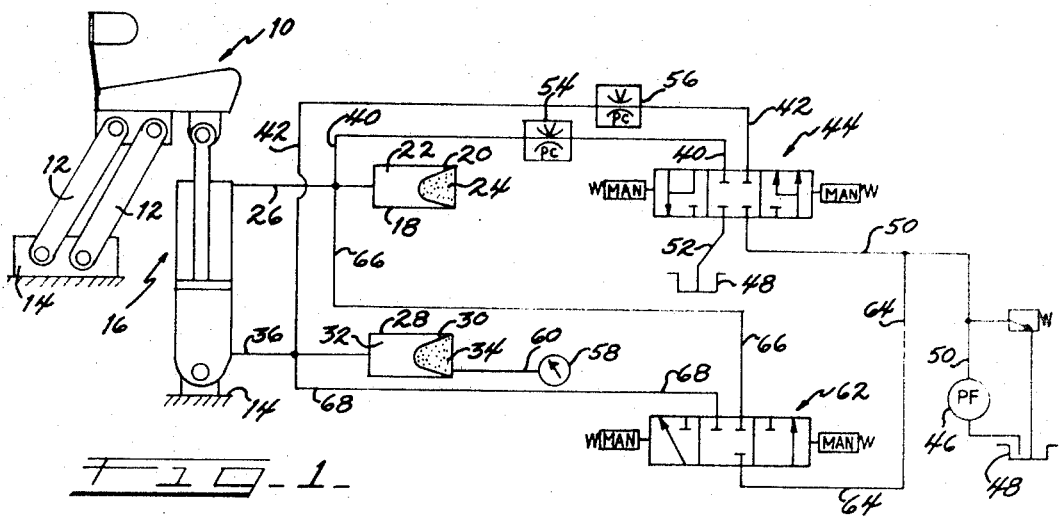
FIGURE 1 is a schematic representation, using standard JIC symbols of a seat suspension incorporating a hydraulic circuit according to the present invention.

Referring now to FIGURE 1, there is shown a seat assembly 10 which is supported by links 12 on a base member 14, such as the frame of a vehicle, for example. A double acting hydraulic ram 16 is pivotally connected between the seat assembly 10 and the base member 14. An upper accumulator 18 having a movable member 20 which separates the accumulator into a hydraulic chamber 22 and a gas chamber 24, is connected to the upper end of the hydraulic ram 16 by means of a conduit 26. The lower accumulator 28 having a movable member 30, which separates the accumulator into a hydraulic chamber 32 and a gas chamber 34, has its hydraulic chamber 32 in fluid communication with the lower end of the hydraulic ram 16 by means of a conduit 36. Extension of the ram 16, occasioned by upward movement of the assembly 10 relative to the base member 14, causes compression of the gas or compressible fluid within the chamber 24 while collapse of the ram 16, due to relative downward movement of the assembly 10, compresses the gas in the chamber 34. Hence, movement of the assembly 10 in either vertical direction is resiliently resisted by one of the accumulators, and similarly, rebound of the assembly 10, follows displacement from its equilibrium position, is positively controlled by the damping effect of the other accumulator. In addition, the fact that gas pressure is applied to both sides of the piston within the double acting ram 16 guarantees that the ram will not be completely extended when the assembly 10 is unoccupied. This limited movement of the assembly facilitates mounting and dismounting thereof by the operator. A pair of conduits 40 and 42 communicate with the conduits 26 and 36 respectively and are separately ported into a spring rate control valve 44. This 3-position, manually actuated, spring centered, rate valve 44 is operatively connected with a hydraulic pump 46 and a reservoir 48 through conduits 50 and 52 respectively. In the center position, the rate valve 44 blocks all four conduits 40, 42, 50 and 52. When shifted to the left, as viewed in the schematic representation of FIGURE 1, the conduit 52 remains blocked and both conduits 40 and 42 are placed in communication with the conduit 50, and when shifted to the right, the pump conduit 50 is blocked and both conduits 40 and 42 are in fluid communication with the reservoir 48 through the conduit 52. The conduits 40 and 42 are provided with variable, pressure compensated, flow control valves 54 and 56 respectively. The function of these valves is to regulate the flow of hydraulic fluid to each end of the ram 16 so that substantially no movement, i.e., neither extension nor collapse, of the ram occurs when the rate valve 44 is moved from its center neutral position. When the ram is of the double rod end or constant displacement type, such a result is achieved by adjusting the valves 54 and 56 so that the flow rate through each is substantially the same regardless of the pressure. When the ram 16 is of the single rod end type, wherein the area of the working surface at the head end of the ram is greater than the area of the working surface at the rod end, the valves 54 and 56 are adjusted so that the rate of flow therethrough is proportional to the area of the working surface upon which the fluid will act. Thus, when it is desired to increase the spring rate, i.e., make the ride "harder," the rate valve 44 is shifted to the left, thereby directing fluid under pressure to both conduits 40 and 42. The flow rate valves 54 and 56 will regulate the flow of hydraulic fluid to either end of the ram 16 in a manner such that there is no movement of the ram while simultaneously causing the compressible fluid within both chambers 24 and 34 to be compressed. The resulting increase in the static pressure within the gas chambers 24 and 34 will produce a higher spring rate and a stiffer ride. When it is desired to decrease the spring rate, i.e., make the ride "softer," the rate valve 44 is shifted to the right, connecting the conduits 40 and 42 to the reservoir 48 through the conduit 52. The pressure within the gas chambers 24 and 34 will force the hydraulic fluid out of the chambers 22 and 32 thereby providing the greater volume for the gas within the chambers 24 and 34. The flow rate valves 54 and 56 will regulate the flow of hydraulic fluid to the reservoir in a manner to preclude movement of the ram 16. The resulting decrease in pressure within the chambers 24 and 34 will decrease the spring rate producing a softer ride for the operator. To assist in achieving the desired spring rate, a pressure gage 58 is connected to one of the gas chambers, such as the lower chamber 34, through a conduit 60.

A height control valve 62, which is also of the 3-position, manually actuated, the spring centered type, is supplied with fluid under pressure from the pump 46 through conduits 50 and 64, and is operatively connected to the conduits 26 and 36 by means of the conduits 66 and 68 respectively. In the center position, which position is illustrated in FIGURE 1, all three conduits 64, 66 and 68 are blocked. When shifted to the right, i.e., when the left portion is oriented where the center portion is located in the schematic view of FIGURE 1, the conduit 66 remains blocked while the conduit 64 and 68 are placed in fluid communication. When shifted to the left, conduit 68 is blocked while the conduits 64 and 66 are placed in fluid communication. Raising the seat is achieved by shifting the rate control valve 62 to the right and thereby directing fluid under pressure from the pump 46 through the conduit 68 to the lower end of the ram 16. With the introduction of hydraulic fluid into the conduit 36, and hence into the hydraulic chamber 32, the pressure within the chamber 34 will be increased. This increase in pressure upsets the equilibrium and the ram 16 must extend forcing fluid from the upper end thereof through the conduit 26 into the fluid chamber 22 of the upper accumulator 18 and compressing the gas within the chamber 24. The ram 16 will therefore be extended, and the seat assembly 10 elevated, while the pressure in both the upper gas chamber 24 and the lower gas chamber 34 is increased; although the pressure differential therebetween is maintained constant. When it is desired to lower the seat assembly 10, the height control valve 62 is moved to the left as viewed in FIGURE 1, connecting the conduit 64 with the conduit 66 and directing fluid under pressure to the conduit 26. The introduction of hydraulic fluid to the fluid chamber 22 increases the pressure within the upper gas chamber 24 necessitating collapse of the hydraulic ram 16. The resulting movement of the ram 16 forces hydraulic fluid under pressure into the hydraulic chamber 32 increasing the pressure within the lower gas chamber 34. Thus the pressure in both the upper and lower gas chambers 24 and 34 is increased as the seat assembly is lowered. In order to regain the desired spring rate, it will be necessary to extract some of the fluid from the hydraulic chambers 22 and 32. This is accomplished by moving the spring rate control valve 44 to the right connecting the conduits 40 and 42 with the reservoir 48 through the conduit 52. Hence, the sequence of adjustment for any given operator once he is seated upon the assembly 10, is to actuate the height control valve 62 in the proper direction to achieve either extension or collapse of the ram 16 until the assembly 10 is at the resired height. He will thereafter move the spring rate control valve 44, while observing the gage 58, in the proper direction to achieve the desired spring rate.

Figure 2:
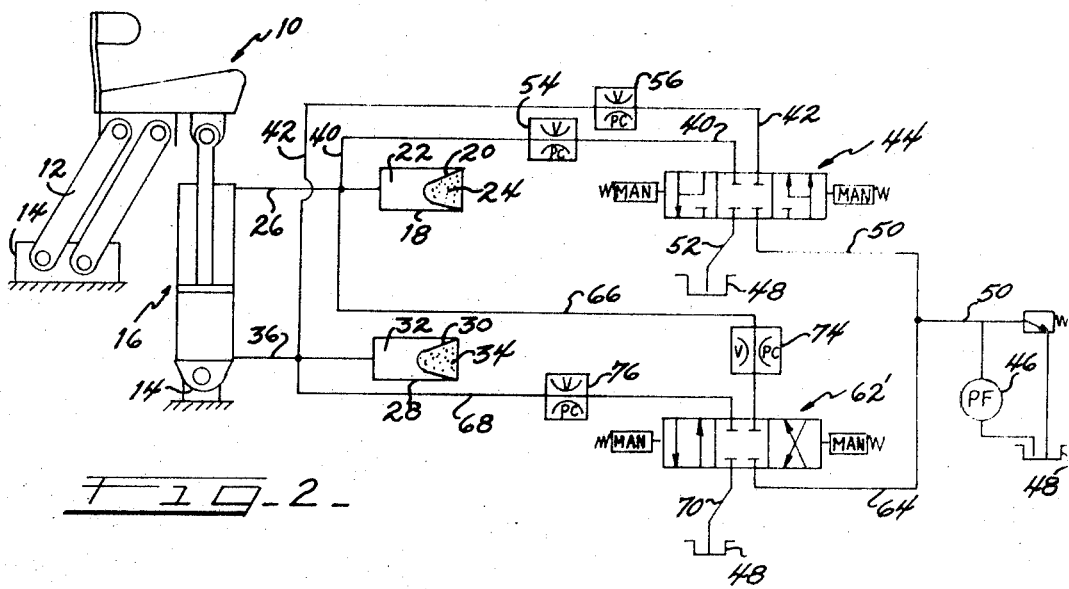
FIGURE 2 is a view similar to FIGURE 1 but showing another embodiment of the present invention.

The embodiment shown in FIGURE 2 is essentially the same as that of FIGURE 1, but incorporates a different height control valve arrangement in order to obviate the necessity of adjusting the spring rate following an adjustment in the height of the seat assembly. The height control valve 62' is connected to the conduits 64, 66 and 68 in the same manner as the valve 62 illustrated in FIGURE 1. However, an additional port is provided to connect the valve 62' with the reservoir 48 through a conduit 70. In the center neutral position all four of these conduits 64, 66, 68 and 70 are blocked. When shifted to the right, the height control valve 62' connects the conduits 64 and 66 as well as connecting the conduits 68 and 70. When shifted to the left, the conduits 64 and 68 are placed in fluid communication while the conduits 66 and 70 are connected. The conduits 66 and 68 are provided with variable, pressure compensated, flow rate control valves 74 and 76 respectively. These valves are adjusted so that the rate of flow of hydraulic fluid therethrough is proportional to the working area upon which the fluid acts within the ram 16. That is, if the working area is equal, then flow rate through each valve should be equal irrespective of the pressure, and if the head end has an area twice as great as the rod end then the flow rate through the flow rate control valve 76 should be twice that through valve 74. It will be apparent, therefore, that the height control valve 62' of this embodiment connects one end of the hydraulic ram 16 with the pump 46 while simultaneously venting the other end of the ram to the reservoir 48. The flow rate control valves 74 and 76, which are pressure compensated, then control the rate of flow in the conduit 66 and 68 in a manner such that the ram 16 can be extended or collapsed without affecting the pressure within the gas chambers 24 and 34. Hence the height or elevation of the seat assembly 10 can be changed independently of, and without in any way affecting the spring rate of the system. It therefore follows that the need for changing or correcting the spring rate following a change in elevation, as required with the embodiment shown in FIGURE 1, is not necessary.

The embodiment shown in FIGURE 3 accomplishes the same function as that of FIGURE 2, viz., independent and positive control of both the spring rate and the height of the seat assembly 10, but accomplishes this end utilizing fewer valve components and with a minimum of piping or tubing employed. The basic seat assembly 10, hydraulic ram and double accumulator arrangement is the same as for the previous two embodiments; the ram being shown as a double rod end type for illustration purposes. The conduit 26 which connects the upper end of the ram 16, the hydraulic chamber 22 of the upper accumulator 18 is connected with an upper control valve 79, which is of the 3-position, manually actuated, spring centered type, by means of a conduit 72. The conduit 36 which connects the lower end of the hydraulic ram 16 with the hydraulic chamber 32 of the lower accumulator 28 is connected with a lower control valve 80, which valve is identical with the valve 79 by means of a conduit 75. The upper control valve 79 is connected with the pump 46 by means of the conduit 50 and is in communication with the reservoir 48 through a conduit 77. The lower control valve 80 is in communication with the pump 46 through conduits 50 and 64 and is connectible with the reservoir 48 through a conduit 78. The conduits 72 and 75 are provided with variable, pressure compensated, flow control valves 82 and 84 respectively. These flow control valves are adjusted to permit flow through the lines or conduits 72 and 75 proportional to the area of the working surface upon which the fluid acts. In order to change the spring rate, the two control valves 79 and 80 are operated in unison. To increase the spring rate, both valves 79 and 80 are shifted to the left as viewed in FIGURE 3, connecting both conduits 72 and 75 with the pump 46. Fluid under pressure is therefore admitted to the fluid chambers 22 and 32 to compress the gas within the chambers 24 and 34, and thereby increase the spring rate. A decrease in the spring rate is achieved by moving both valves 79 and 80 to the right, as viewed in FIGURE 3 which connects both conduits 72 and 75 to the reservoir 48 through the conduits 76 and 78 respectively. Changes in the height or elevation of the seat assembly 10 are achieved by moving the valves 79 and 80 simultaneously but in opposite directions. That is, in order to lower the seat, the upper control valve 79 is shifted to the left connecting the conduit 72 with the conduit 50 while the lower control valve 80 is shifted to the right connecting the conduit 74 with the reservoir through the conduit 78. The flow rate control valves 82 and 84 regulate the rate of flow of hydraulic fluid into the top of the ram 16 as well as out of the lower end of the ram 16 in a manner such that the gas pressure within the chambers 24 and 34 remains unchanged. Increasing the height of the seat assembly 10 is achieved by moving the upper control valve 79 to the right which vents the top of the hydraulic ram 16 to the reservoir 48 while the lower control valve is shifted to the left connecting the lower end of the ram 16 with the pump 46. The ram 16 will be extended thereby, and the seat assembly 10 raised, without appreciably affecting the pressure within the chambers 24 and 34.

A mechanical mechanism for actuation of the control valves 79 and 80 in unison to achieve a change in the spring rate and movement of these valves in opposite directions in order to change the elevation of the seat assembly is illustrated in FIGURE 4. A hand lever 90 is supported by a universal ball connector 92 approximately midway between the control valves 79 and 80, and extends up through an H-shaped opening 94 provided in a panel member 96 positioned, for convenience, near the operator's station. The universal connector 92 is preferably of the type which is spring biased to return the control lever 90 to a vertically oriented position midway of the crossbar of the H-shaped opening 94. The body member 98 of the upper control valve 79 is pinned at 99 to a stationary member on the vehicle while the spool 100 is pivotally connected by pin means 101 to a lever 102. The lever 102 is pivotally supported at 104 to a stationary part of the vehicle and is provided at a point on the other side of the pivot pin 104 from the spool 100 with a rigidly affixed bifurcated bracket 106. A second bifurcated bracket 108 is secured to the lever 102 at a point intermediate the pivot pin 104 and the spool 100. The body member 110 of the lower control valve 80 is pivotally secured at 111 to a stationary portion of the vehicle while the spool member 112 is pivotally secured by pin means 114 to a lever 116. This lever 116 is pivotally supported from a stationary portion of the vehicle by pin means 118 at a point above the universal connector 92 and is provided with a bifurcated bracket 120 secured thereto at a point intermediate the pivot pin 118 and the universal connector 92, and a second bifurcated bracket 122 affixed at a point intermediate the pivot pin 114 and the level of the unversal connector means 92. The pivot points and the length of the levers are arranged so that when the hand lever 90 is moved to the vertical leg of the H-shaped opening indicated by the term "RATE" in FIGURE 4, the lever will be pivoted about the universal connector means 92 so that it is positioned between the bifurcated brackets 108 and 120. Movement of the hand lever 90 along the vertical rate leg toward the "HARD" position will simultaneously pivot lever 116 about the pivot pin 118 causing the spool 112 to be inserted while the other end of the lever 90 will cause the bifurcated bracket 108 to pivot the lever 102 about the pivot pin 104 to insert the spool 100 into the valve body member 98. Since the valves 79 and 80 are of identical construction, both of the conduits 72 and 74 will be subjected to hydraulic fluid pressure from the pump 46 resulting in an increase in the spring rate. Similarly, movement of the hand lever 90 along the vertical "RATE" leg toward the end indicated by the term "SOFT" will cause the two spools 100 and 112 to be extracted from their respective body members, thereby venting both conduits 72 and 75 to the reservoir 48. Movement of the hand lever 90 along the connecting bar of the H-shaped opening 94 toward the leg indicated by the term "HEIGHT" positions the lever 90 between the two brackets 106 and 122. Movement of the lever 90 along the vertical "HEIGHT" leg of the H-shaped opening 94 in either direction will result in actuation or movement of the spools 110 and 112 in opposite directions relative to their respective valve bodies. Thus, as the hand lever 90 is moved to the "RAISE" position, the lever 102 is pivoted about the pin 104 in a direction to insert the spool 100 in the valve body member 98 while lever 116 is pivoted to extract the valve spool 112 from the body member 110. This connects the conduit 75 to the pump while porting the conduit 72 to the reservoir 48. Moving the hand lever 90 to the "LOWER" end of the "HEIGHT" leg causes the lever 102 to pivot about the pin 104 in the opposite direction extracting the spool 100 from the body member 98, while the lever 106 is simultaneously pivoted in a direction to insert the spool member 112 into the body member 110. It will be appreciated that the embodiment shown in FIGURE 3 permits a single lever control for both the height and spring rate for the seat assembly 10 and effects desirable economies by simplyfiing the extent of piping required, reducing the number of pressure compensating flow valves, and by utilizing spring rate and height control valves which are identical in construction.

I claim:

1. In a hydraulic suspension for a seat of a vehicle having a seat assembly, and linkage means mounting said assembly for upward and downward movement relative to the vehicle, the improvement comprising:
   a double-acting hydraulic ram connected between said assembly and vehicle and responsive to said movement;
   a pair of accumulators each having a movable member defining a compressible fluid chamber and a hydraulic chamber therein;
   one of said accumulators having its hydraulic chamber connected in fluid communication with the upper end of said ram; and
   the other of said accumulators having its hydraulic chamber in fluid communication with the lower end of said ram, whereby relative downward movement of said assembly is resisted by the compressible fluid chamber in said other accumulator and relative upward movement of said assembly is resisted by said one accumulator.

2. In a hydraulic seat suspension according to claim 1 wherein said double-acting ram is a constant displacement type so that the upward movement of said assembly upon dismounting is minimized.

3. In a hydraulic seat suspension according to claim 1, and further comprising:
   first valve means for selectively directing hydraulic fluid under pressure to or draining hydraulic fluid from one of said lower and upper ends whereby the elevation of said assembly may be adjusted.

4. In a hydraulic seat suspension according to claim 1 and further comprising:
   first valve means for selectively directing hydraulic fluid pressure to or draining hydraulic fluid from both ends of said ram simultaneously to respectively increase and decrease the spring rate of the seat suspension.

5. In a hydraulic seat suspension according to claim 4 and further comprising:
   a first pressure compensating flow control means operatively connected between said first valve means and each end of said ram.

6. In a hydraulic seat suspension according to claim 5, wherein said first flow control means is adjusted to regulate the flow from and to each end of said ram in proportion to the working area of said ends.

7. In a hydraulic seat suspension according to claim 6, and further comprising:
   second valve means operatively connected to both ends of said ram for selectively directing hydraulic fluid under pressure to one of said ends, whereby the elevation of said seat assembly may be changed.

8. In a hydraulic seat suspension according to claim 7 wherein said first valve means has a neutral position for preventing fluid communication between said ends and said second valve means exhausts fluid from the other end of said ram while simultaneously directing fluid under pressure to said one end, and further comprising:

a second pressure compensating flow control means operatively connected between each of said ends and said second valve means, said second valve means regulating flow to and from each of said ends so that movement of said ram is accomplished when said second valve means is actuated without affecting the pressure in said fluid chambers of the accumulators.

9. In a hydraulic seat suspension according to claim 1 and further comprising:

a pair of directional control valves each having a pressure directing position and an exhausting position;

one of said valves connected to one end of said ram, and the other of said valves connected to the other end of said ram;

said valves being simultaneously movable in unison to said pressure positions and said exhaust positions to respectively increase and decrease the spring rate and being simultaneously movable in opposite positions to change the elevation of said assembly.

10. A hydraulic seat suspension according to claim 9 and further comprising:

pressure-compensating flow control means interposed between each of said valves and the associated end of said ram.

11. A hydraulic seat suspension acording to claim 10 wherein said valves are movable by a linkage means comprising:

a hand lever;

universal mounting means for mounting said hand lever between said valves;

first and second lever means pivotally secured between the vehicle and said valves;

each of said lever means having upper and lower bifurcated bracket means;

said universal mounting means permitting transverse movement of said hand lever to selectively engage one of the upper and lower bracket means on said first lever means while respectively engaging the other of the lower and upper bracket means on said second lever means, and thereafter permitting longitudinal movement of said hand lever to cause pivoting of said lever means.

12. A hydraulic seat suspension according to claim 11, wherein said hydraulic ram is of the double rod end type so that the movement of said assembly upon dismounting is minimized.

References Cited

UNITED STATES PATENTS

| 1,420,256 | 6/1922 | Hammond | 91—465 |
| 2,978,044 | 4/1961 | Baines | 60—54.5 |
| 3,363,514 | 1/1968 | Ramcke | 91—410 |
| 2,791,263 | 5/1957 | Chayne | 297—347 |
| 2,955,897 | 10/1960 | Nue | 60—51 |

FOREIGN PATENTS

| 637,329 | 1/1928 | France. |
| 767,957 | 9/1967 | Canada. |
| 897,955 | 6/1962 | Great Britain. |
| 1,087,454 | 8/1960 | Germany. |

PAUL E. MASLOUSKY, Primary Examiner

U.S. Cl. X.R.

91—210, 465, 466; 92—134; 297—330